(12) United States Patent
Mugan et al.

(10) Patent No.: US 11,804,671 B2
(45) Date of Patent: Oct. 31, 2023

(54) ROTATABLE ELECTRICAL RECEPTACLE ASSEMBLY FOR LUMINAIRE

(71) Applicant: Amphenol Corporation, Wallingford, CT (US)

(72) Inventors: Shan Mugan, Markham (CA); Adrian Green, Newcastle (CA)

(73) Assignee: AMPHENOL CORPORATION, Wallingford, CT (US)

( * ) Notice: Subject to any disclaimer, the term of this patent is extended or adjusted under 35 U.S.C. 154(b) by 200 days.

(21) Appl. No.: 17/336,949

(22) Filed: Jun. 2, 2021

(65) Prior Publication Data

US 2021/0384669 A1 Dec. 9, 2021

Related U.S. Application Data

(60) Provisional application No. 63/034,472, filed on Jun. 4, 2020.

(51) Int. Cl.
*F21V 17/02* (2006.01)
*H01R 13/627* (2006.01)
(Continued)

(52) U.S. Cl.
CPC ......... *H01R 13/6271* (2013.01); *F21V 17/02* (2013.01); *F21V 23/0464* (2013.01);
(Continued)

(58) Field of Classification Search
CPC . H01R 13/6271; H01R 13/5202; F21V 17/02; F21V 23/0464; F21V 23/06; F21W 2131/103
See application file for complete search history.

(56) References Cited

U.S. PATENT DOCUMENTS

| 4,477,143 A | 10/1984 | Taylor |
| 4,653,834 A | 3/1987 | Norden |

(Continued)

FOREIGN PATENT DOCUMENTS

| GB | 2 524 095 A | 9/2015 |
| WO | WO 2020/099393 A1 | 5/2020 |

OTHER PUBLICATIONS

International Search Report and Written Opinion from PCT/US2021/035716 dated Aug. 27, 2021.
(Continued)

*Primary Examiner* — Tho D Ta
(74) *Attorney, Agent, or Firm* — CANTOR COLBURN LLP

(57) ABSTRACT

An electrical receptacle assemblies and methods for assembling and mounting toolless receptacle assemblies to a housing of a luminaire. The receptacle assembly includes a rotatable receptacle that has an insert portion with an electrical face configured to mate with a photoelectric device and includes an outer ring portion that has a mounting face opposite the electrical face. The mounting face is configured to mount on the housing. A locating mechanism of the receptacle assembly is configured to orient the rotatable receptacle on the housing in a desired direction for optimal positioning of the photoelectric device. A locking base is configured to receive at least a portion of the insert portion. A releasable retention member if configured to couple to the locking base and the insert portion of the rotatable receptacle for securing the receptacle assembly to the housing.

25 Claims, 7 Drawing Sheets

(51) Int. Cl.
*H01R 13/52* (2006.01)
*F21V 23/04* (2006.01)
*F21V 23/06* (2006.01)
*F21S 8/08* (2006.01)
*F21W 131/103* (2006.01)

(52) U.S. Cl.
CPC ......... *F21V 23/06* (2013.01); *H01R 13/5202* (2013.01); *F21S 8/085* (2013.01); *F21V 23/0442* (2013.01); *F21W 2131/103* (2013.01)

(56) References Cited

U.S. PATENT DOCUMENTS

| | | | |
|---|---|---|---|
| 7,637,766 B2 | 12/2009 | Kauffman et al. | |
| 8,038,481 B1 | 10/2011 | Creighton et al. | |
| 8,398,435 B2 | 3/2013 | Aurongzeb et al. | |
| 9,077,112 B2* | 7/2015 | Mitchell | H01R 13/6397 |
| 9,347,822 B2 | 5/2016 | Mostoller et al. | |
| 9,638,405 B2* | 5/2017 | Hobson | F21V 23/0464 |
| 9,651,420 B2 | 5/2017 | Weber | |
| 9,691,582 B2 | 6/2017 | Ye | |
| 9,974,143 B2 | 5/2018 | Stuby, Jr. | |
| 10,175,104 B2 | 1/2019 | Howard | |
| 10,330,301 B1 | 6/2019 | Howard et al. | |
| 2007/0001113 A1 | 1/2007 | Langlois | |
| 2009/0088021 A1 | 4/2009 | Kauffman et al. | |
| 2013/0210252 A1* | 8/2013 | Ilyes | H01R 33/945 439/226 |
| 2015/0260377 A1 | 9/2015 | Hobson | |
| 2015/0323380 A1 | 11/2015 | Mostoller et al. | |
| 2016/0111813 A1 | 4/2016 | Ye | |
| 2016/0312984 A1* | 10/2016 | Poorter | F21K 9/00 |
| 2019/0162400 A1 | 5/2019 | Mostoller et al. | |

OTHER PUBLICATIONS

International Search Report and Written Opinion from PCT/US2021/035851 dated Aug. 27, 2021.

* cited by examiner

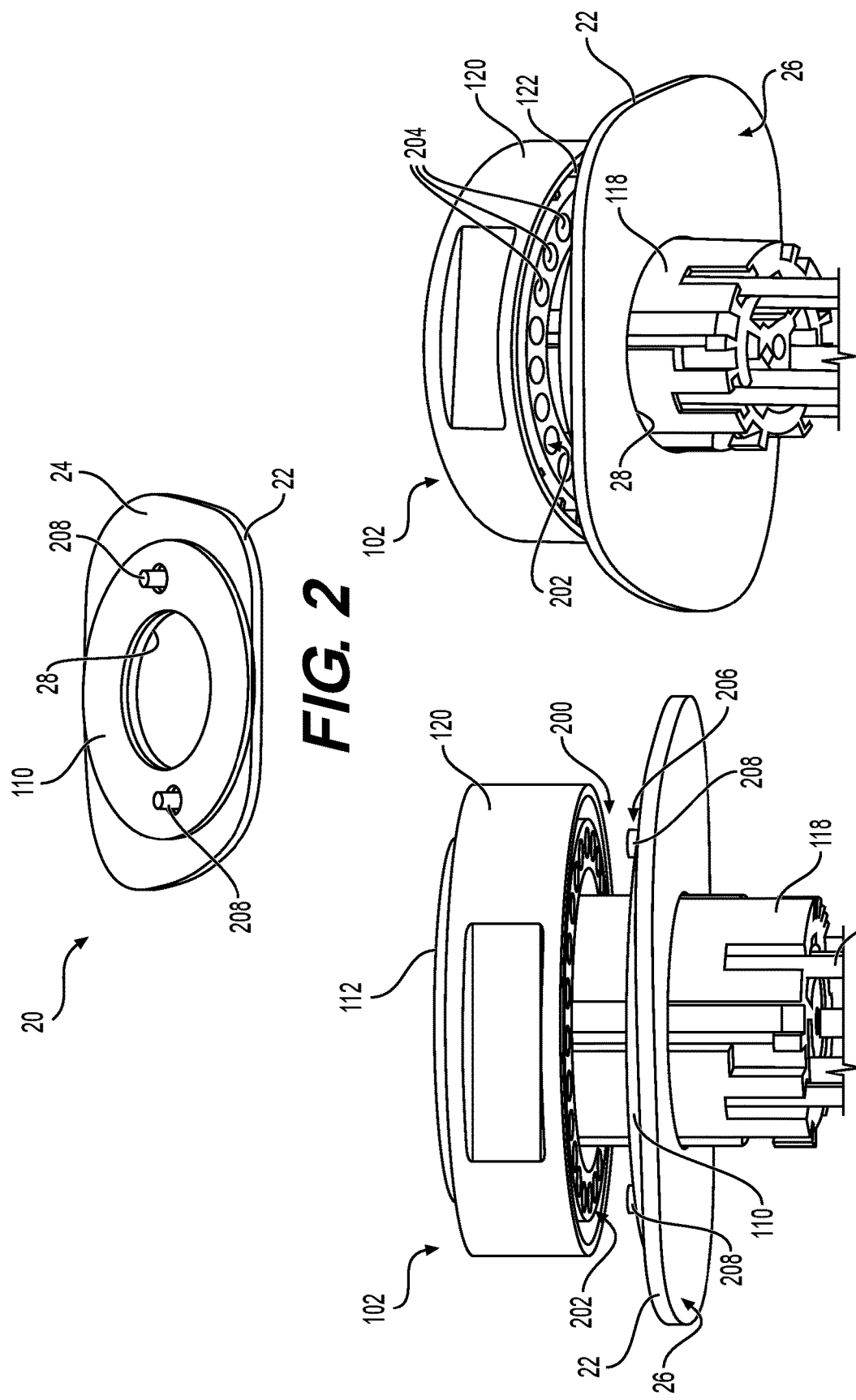

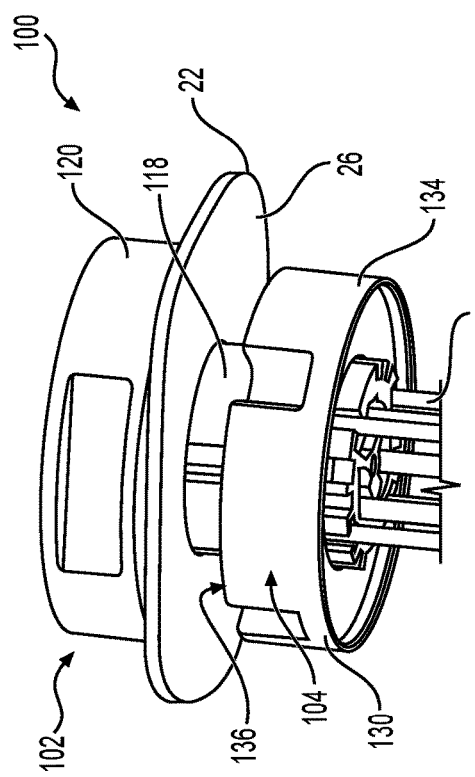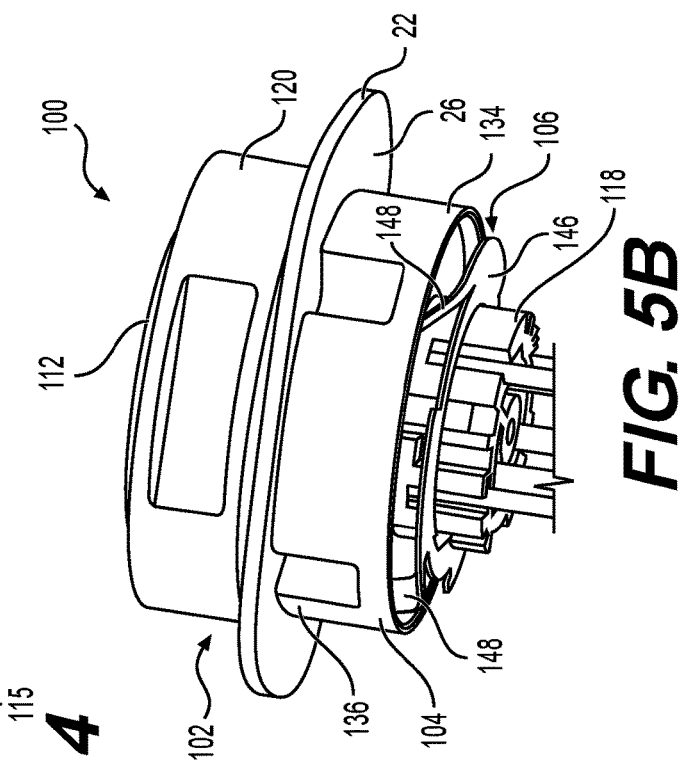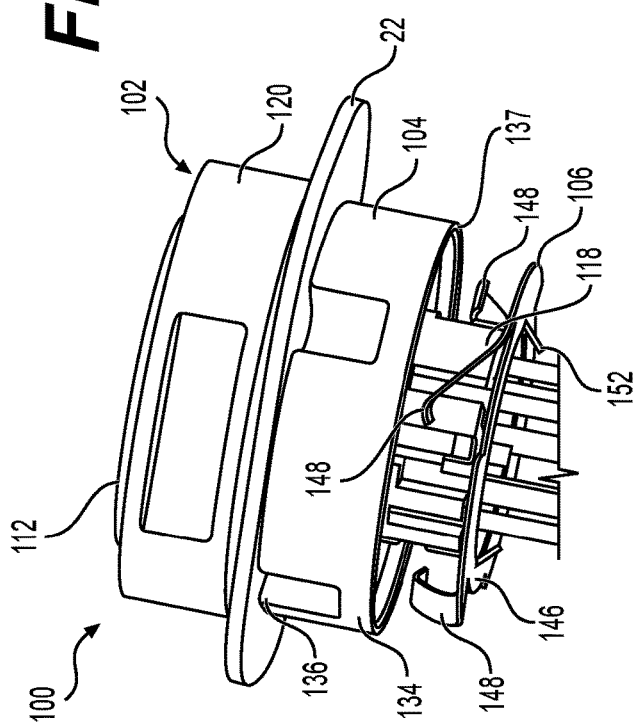

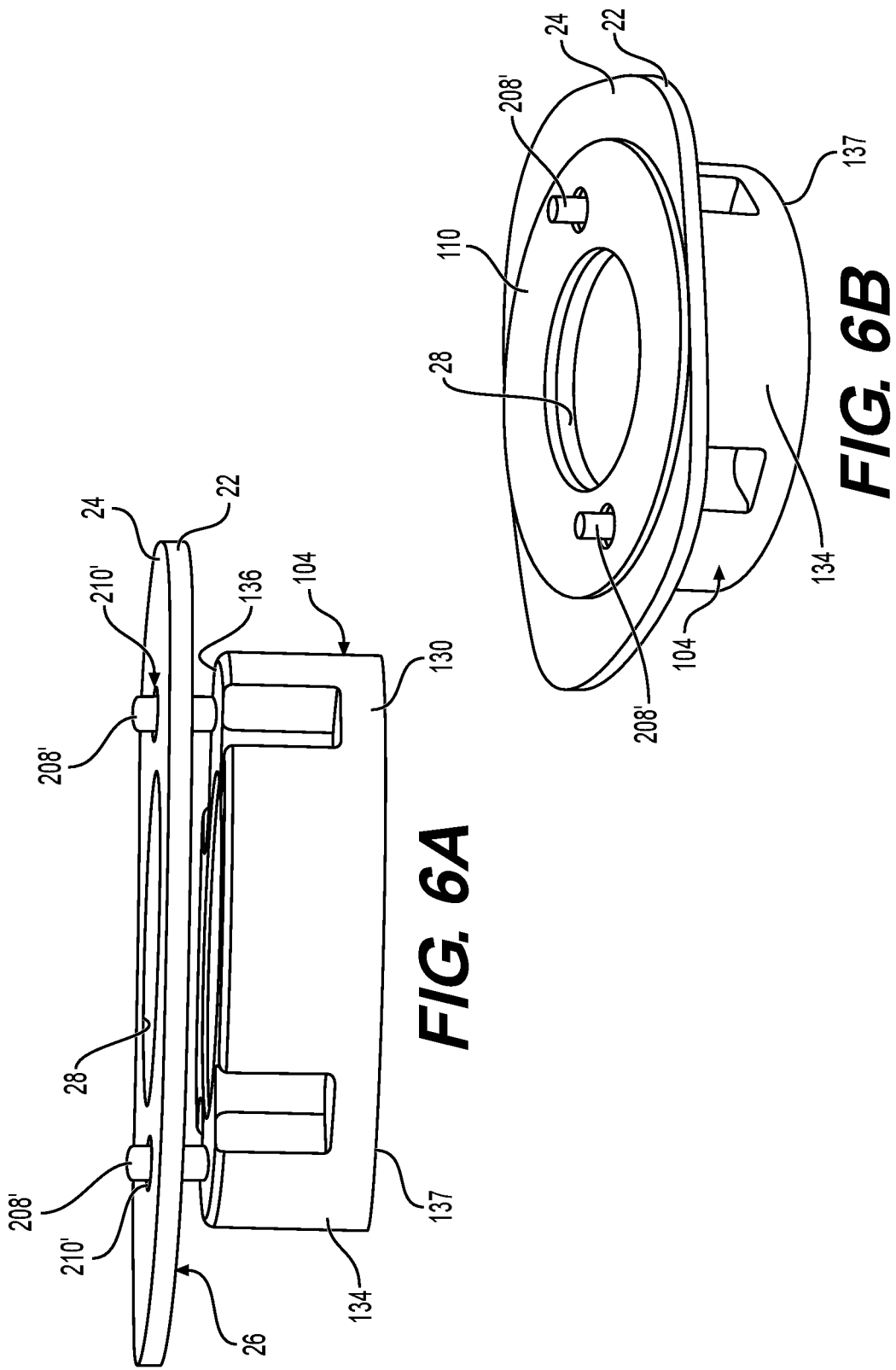

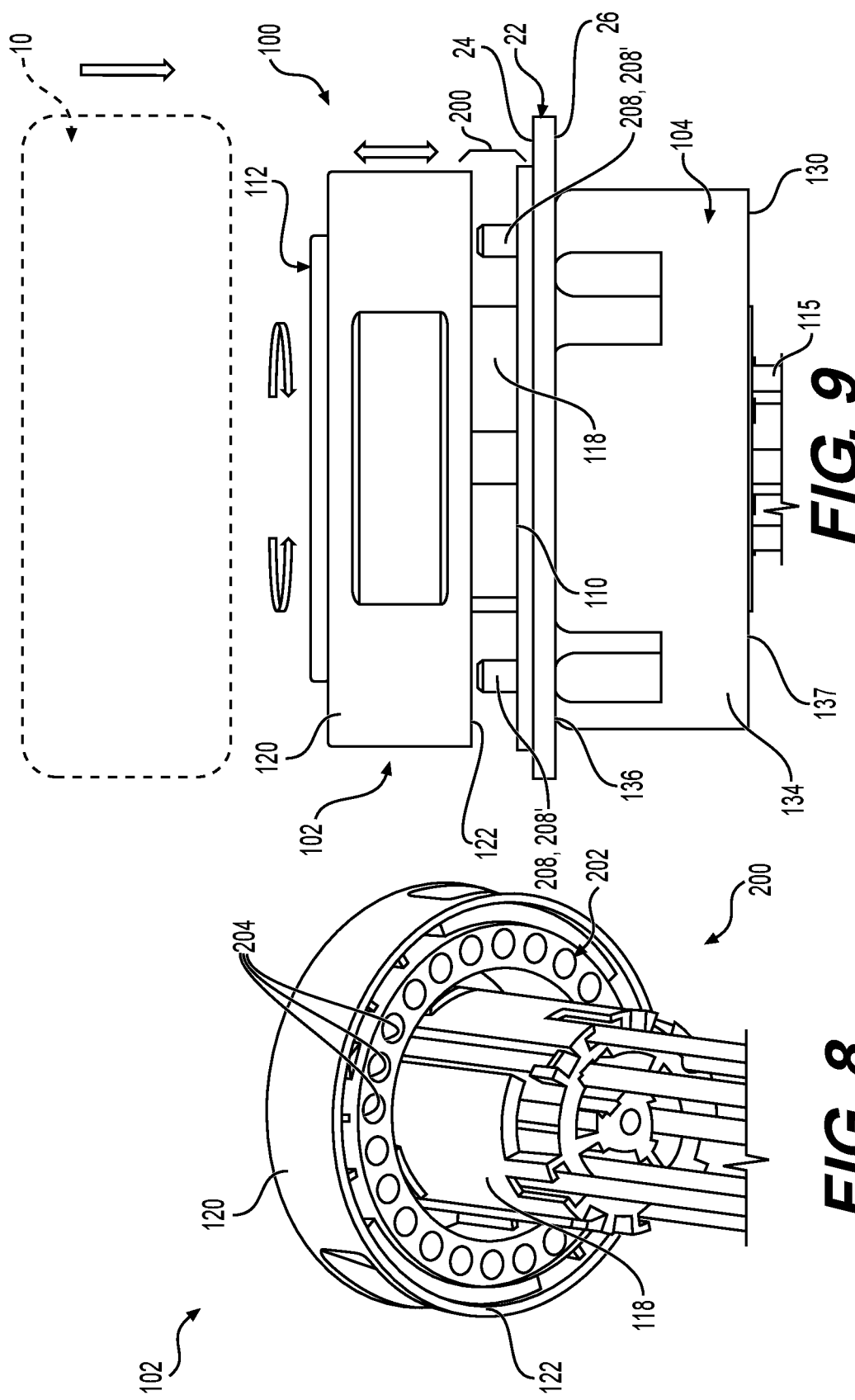

ROTATABLE ELECTRICAL RECEPTACLE ASSEMBLY FOR LUMINAIRE

RELATED APPLICATIONS

This application claims the benefit of priority of U.S. Provisional Application Ser. No. 63/034,472, filed on Jun. 4, 2020, and entitled Rotatable Dimming Receptacle For Luminaire, the content of which is incorporated herein by reference in its entirety.

BACKGROUND

The present disclosure relates to rotatable electrical receptacles used with luminaires, such as street lighting.

Photoelectric devices, such as controllers, sensors, or photocells, are commonly used to automatically control luminaires, for example, by dimming them or turning them off at dawn and on at dusk and. These luminaires are typically used to light roadways, streets, parking lots and other large outdoor areas. The photoelectrical device is attached to the luminaire by a receptacle. These photoelectric devices sense the intensity of the ambient light from the sun (or other light sources) and may turn the luminaires on and off accordingly. These luminaires can be dimmed to variable levels depending on sensor input. The photoelectric device of the luminaire could also look for motion (traffic, or pedestrian presence), and/or ambient light levels, to control how much additional light is needed by the luminaire. It is common to point the photocell light sensor of the photoelectric device generally in the North direction to optimize efficiency of the photocell.

SUMMARY

The present disclosure relates to an electrical receptacle assembly for mounting to a housing of a luminaire that comprises a rotatable receptacle that has an insert portion with an electrical face configured to mate with a photoelectric device and an outer ring portion that has a mounting face opposite the electrical face. The mounting face is configured to mount on the housing. A locating mechanism is configured to orient the rotatable receptacle on the housing in a desired direction for optimal positioning of the photoelectric device. A locking base is configured to receive at least a portion of the insert portion. A releasable retention member is configured to couple to the locking base and the insert portion of the rotatable receptacle for securing the receptacle assembly to the housing. In one example, the electrical receptacle assembly is toolless.

In certain examples, a gasket is disposed between the mounting face of the outer ring portion of the rotatable receptacle and a mounting side of the locking base; the locating mechanism comprises corresponding locating features including one or more locating holes formed in the mounting surface of the outer ring portion that are each configured to receive a locating pin on the housing; the locating holes are arranged annularly and spaced apart on the outer ring portion; wherein each locating pin extends through a gasket that is disposed between the outer ring portion of the rotatable receptacle and the locking base; wherein the locating mechanism comprises corresponding locating features includes one or more locating holes formed in the mounting surface of the outer ring portion that are each configured to receive a locating pin on the locking base; each locating pin extends from a mounting side of the locking base and is configured to extend through the housing; and/or each locating pin extends through a gasket disposed between the outer ring portion of the rotatable receptacle and the locking base.

In other examples, the electrical face of the rotatable insert includes indicia that facilitates proper positioning of the insert; the indicia is the letter N or the word North; the releasable retention member is a spring member that comprises a locking base engagement portion and an insert portion engagement portion; and/or the locking base engagement portion is a substantially flat ring and the insert portion engagement portion is one or more spring arms extending from the ring.

The present disclosure may also relate to a kit of components for a photoelectric receptacle assembly that comprises a rotatable receptacle that has an insert portion with an electrical face configured to mate with a photoelectric device and an outer ring portion that has a mounting face opposite the electrical face. The mounting face is configured to mount to an outer surface of a housing of a luminaire. A locating mechanism is configured to orient the rotatable receptacle on the housing in a desired direction for proper positioning of the photoelectric device. A locking base that comprises a ring body is configured to receive at least a portion of the insert portion, the locking base having a mounting side for mounting to an inner surface of the housing of the luminaire. A releasable retention member is configured to couple to the locking base at a side of the locking base that is opposite the mounting side of the locking base and configured to couple to the insert portion of the rotatable receptacle.

In some examples of the kit, the locating mechanism includes one or more locating holes in the mounting face of the outer ring portion of the rotatable receptacle; the locating mechanism includes one or more locating pins, and each locating hole is sized to received one of the locating pins; the one or more locating pins extend from the mounting side of the locking base; a gasket is configured to fit between the outer ring portion of the rotatable receptacle and the locking base; and/or the releasable retention member includes a spring member that comprises a locking base engagement portion and an insert portion engagement portion, and wherein the locking base engagement portion is a substantially flat ring and the insert portion engagement portion is one or more spring arms extending from the ring.

The present disclosure may further relate to a method of mounting a photoelectric receptacle assembly to a luminaire, comprising the steps of mounting a rotatable receptacle onto an outer surface of a housing of the luminaire, the receptacle having an electrical face for mating with a photoelectric device; rotating the rotatable receptacle to orient the rotatable receptacle in a desired direction for proper positioning of the photoelectric device; after orienting the rotatable receptacle in the desired direction, moving the rotatable receptacle toward the outer surface of the housing and engaging corresponding locating features of the receptacle assembly, thereby fixing the rotatable receptacle in the desired direction; and securing the rotatable receptacle to the housing.

In certain examples, the method further comprises the step of mounting a locating base on the inner surface of the housing and the locating base is configured to receive an insert portion of the receptacle; and/or the method further comprises the step of positioning a gasket between a mounting face of an outer ring portion of the rotatable receptacle and a mounting side of the locating base.

In other examples of the method, the locating base is mounted on the housing after the step of fixing the receptacle in the desired direction; the locating base is mounted on the housing before the step of mounting the rotatable receptacle onto the outer surface of the housing; the step of engaging corresponding locating features of the receptacle assembly includes engaging at least one locating pin with one of a plurality of locating holes in a mounting face of an outer ring portion of the rotatable receptacle; the step of securing the rotatable receptacle to the housing includes releasably coupling a retention spring member to the locating base and to the insert portion of the rotatable receptacle; and/or no fasteners are used to mount the rotatable receptacle to the luminaire.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIG. 2 is a perspective partial view of a housing with a gasket thereon according to an exemplary method of assembling and mounting the receptacle assembly to the housing;

FIGS. 3A and 3B are side and bottom perspective views, respectively, of a receptacle of the receptacle assembly illustrated in FIG. 1A, showing the mounting of the receptacle to the housing shown in FIG. 2;

FIG. 4 is a bottom perspective of a locking base of the receptacle assembly illustrated in FIG. 1A, showing the assembly of the locking base onto the receptacle shown in FIGS. 3A and 3B;

FIGS. 5A and 5B are bottom perspective views of a retention member of the receptacle assembly illustrated in FIG. 1A, showing the assembly of the retention member on the locating base shown in FIG. 4;

FIGS. 6A and 6B are perspective views of a housing and a locking base of the receptacle assembly illustrated in FIG. 1B, according to another exemplary method of assembling and mounting the receptacle assembly to the housing;

FIG. 8 is a bottom perspective view of the receptacle illustrated in FIGS. 1A and 1B;

FIG. 9 is an elevational view of the receptacle assemblies illustrated in FIGS. 1A and 1B, showing the receptacle being rotated and mounted to the housing;

DETAILED DESCRIPTION

The present disclosure relates to rotatable electrical receptacle assemblies and methods for assembling and mounting the same to a luminaire or the like. The present disclosure also relates to a kit of components of the rotatable electrical receptacle assembly. The receptacle assemblies can be used to mount a photoelectric device onto the luminaire or the like. The rotatable nature of the receptacle of the receptacle assembly facilitates positioning of the photocell or photosensor of the photoelectric device on the luminaire for optimization of the photocell efficiency of the photoelectric device.

The receptacle assemblies of the present disclosure may be toolless. That is the receptacle assembly may be designed such that no tools are require to assemble the receptacle assembly to luminaire. The receptacle assemblies may also be designed such that the receptacle thereof can be rotated and mechanically locked in place at a select interval, such as 15° interval. The receptacle assembly may have a lift-rotate and lock feature which makes adjustment of North positioning of the receptacle simple. And a retention member may be provided that is configured to be pushed, rotated and removed for easy maintenance and removal and replacement of receptacles in the field.

The present disclosure relates to a rotatable electrical receptacle assembly 100, such as those configured to mount to a luminaire 20 or the like, and mate with a photoelectric device 10 associated with the luminaire 20, such as a dimming street lighting, for example. The present disclosure also relates to a kit of components of the receptacle assembly 100.

Figure 1A:
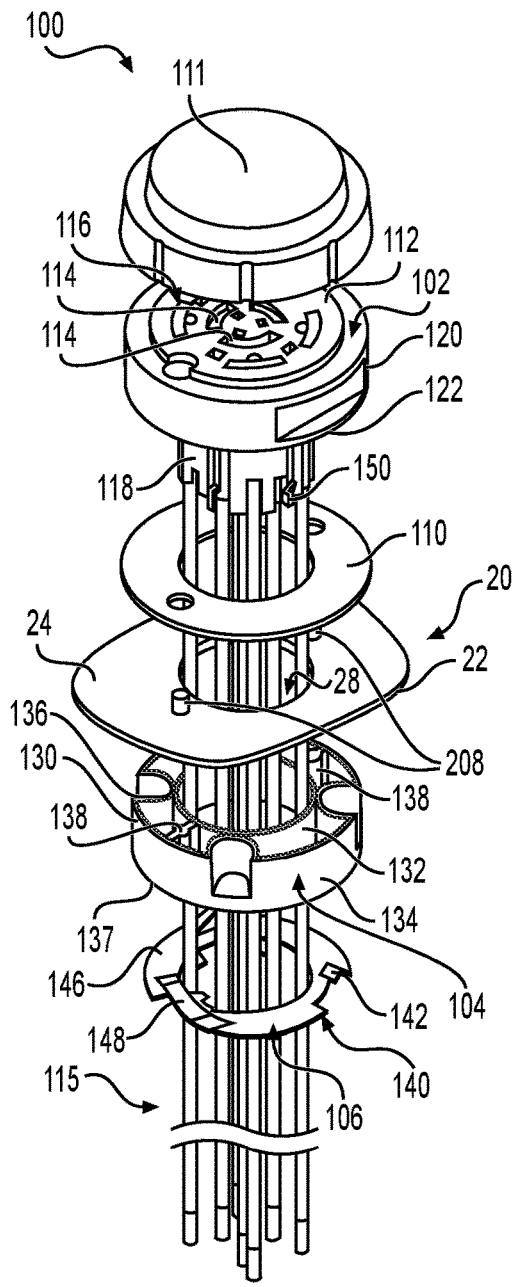
FIG. 1A is an exploded perspective view of a rotatable receptacle assembly according to an example of the present disclosure.
Figure 1B:
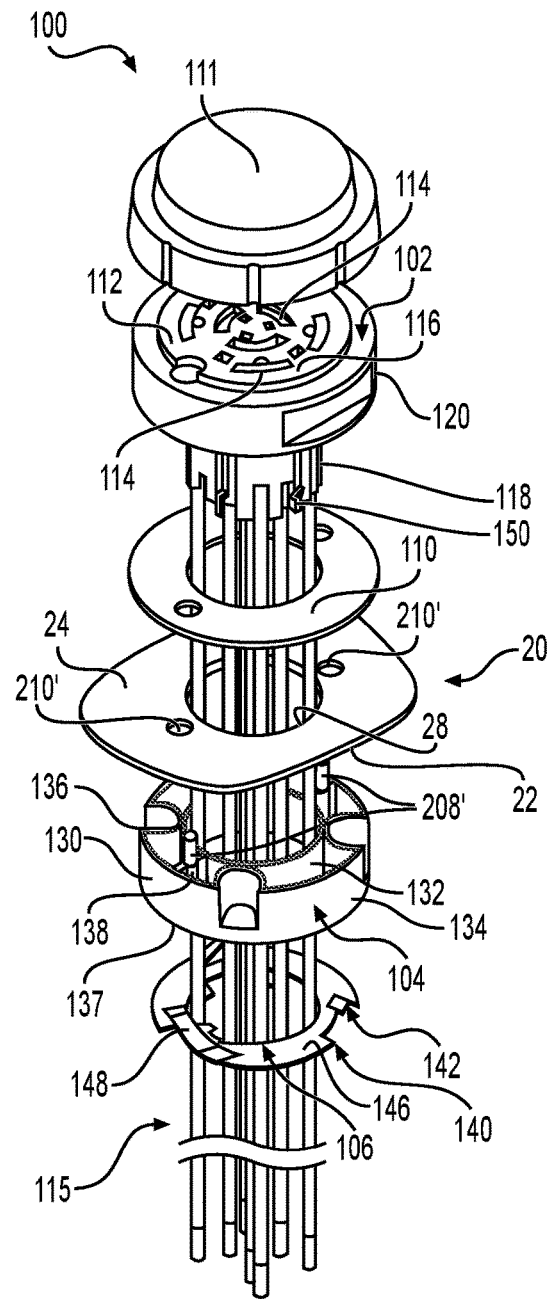
FIG. 1B is an exploded perspective view of the rotatable receptacle assembly according to another example of the present disclosure.
Figure 7A:
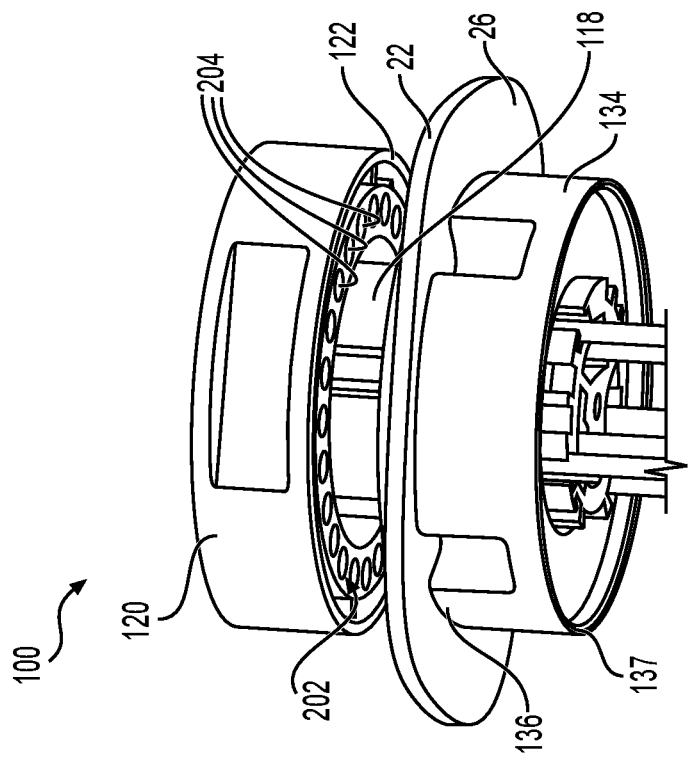
FIGS. 7A and 7B are side and bottom perspective views, respectively, of the receptacle of the receptacle assembly illustrated in FIG. 1B, showing the mounting of the receptacle to the housing shown in FIGS. 6A and 6B.
Figure 7B:
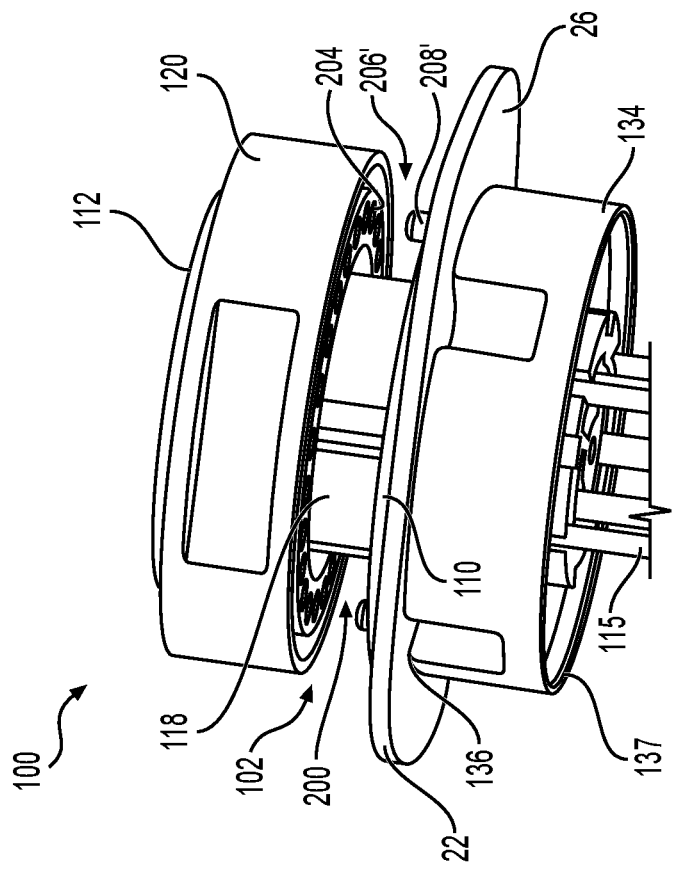

Referring to FIGS. 1A and 1B, a receptacle assembly 100 of the present disclosure comprises a rotatable receptacle 102, a locking base 104, and a retention member 106. The receptacle 102 mounts to a housing 22 (also referred to as a housing wall), such as a housing of the luminaire 20. The housing 22 has an outer surface 24, an inner surface 26 (FIGS. 3A and 3B), and an opening 28 for receiving a portion of the receptacle 102 when mounting the receptacle assembly 100. A gasket 110 can be provided between the receptacle 102 and the housing 22. A cap 111 for the receptacle 102 can be provided for protection during shipping. The receptacle 102 is configured so that the photoelectric device 10 can be plugged therein at an electrical face 112 of the receptacle 102. A locating mechanism 200 (FIGS. 8 and 9) is configured to orient the rotatable receptacle 102 when mounted on the outer surface 24 of the housing 22 in a desired direction for optimal positioning of the photoelectric device 10 to achieve optimal photocell efficiency and operation.

The rotatable receptacle 102 may be a one-piece component that comprises an insert portion 118 and an outer ring portion 120. In other examples, the rotatable receptacle 102 may be made of more than one piece. The electrical face 112 of the receptacle 102 is on the insert portion 118. The electrical face 112 can connect to the photoelectric device 10 via sockets 114 at the electrical face 112. The outer ring portion 120 surrounds the insert portion 120 at or near the end of insert portion 120 with the electrical face 112. The outer ring portion 120 has a mounting face 122 opposite the electrical face 112. The mounting face 122 is configured to mount on the housing 22.

The insert portion 118 is configured to be received in the opening 28 of the housing when mounting the receptacle 102 thereto. The locking base 104 and retention member 106 can be positioned within the housing 22 and are configured to cooperate with the insert portion 118 to lock the assembly and to mount the receptacle 100 to the housing 20.

The locking base 104 has a generally ring shaped body 130 configured to receive a portion of the insert portion 118, as seen in FIG. 4. The ring shaped body 130 includes an inner ring wall 132 and an outer ring wall 134, as seen in FIGS. 1A and 1B. The inner ring wall 132 is sized to receive the insert portion 118 of the receptacle 102. The ring shaped body 130 includes a mounting side 136 for mounting the locking base 104 to the inner surface 26 of the housing 22. The opposite side 137 of the locking base 104 is designed to engage the retention member 106. One or more supports 138 can extend between the inner and outer rings walls 132 and 134. While the body 130 is ring shaped in some examples, the body 130 may have other shapes in other examples, such as, for example, an oval or rectangular shape.

The retention member 106 is configured to couple to the locking base 104 and the insert portion 118 of the receptacle 102 when securing the receptacle assembly 100 to the housing 22. In some examples, the retention member 106 is designed to be releasable. The releasable retention member 106 is configured to engage and disengage with the locking base 104 and the insert portion 118 to allow for easy disassembly and/or adjustment of the receptacle assembly 100 on the housing 22. The retention member 106 can be spring member that comprises a locking base engagement portion 140 and an insert portion engagement portion 142. As seen in FIGS. 5A and 5B, the locking base engagement portion 140 may be a substantially flat ring 146 and the insert portion engagement portion 142 can be one or more spring arms 148 extending from the ring 146.

The locating mechanism 200 of the receptacle assembly 100 is configured to orient the rotatable receptacle 102 on the housing 22 in a desired direction for optimal positioning of the photoelectric device 10, e.g. for orienting the rotatable receptacle 102 to the North. The locating mechanism 200 comprises corresponding locating features that engage one another once the receptacle 102 is oriented in the desired direction. The first locating feature 202 can be one or more locating holes 204 disposed in the mounting face 122 of the outer ring portion 120 of the receptacle 102, as best seen in FIG. 8. The locating holes 204 are accessible from underneath or inside of the outer ring portion 120 such that the holes 210 will face the housing 22 when mounting the receptacle 102. The locating holes 210 can be positioned annularly around the outer ring portion 120 and can be generally uniformly spaced from one another. The number of locating holes 210 can be selected to provide flexibility to the installer when mounting and orienting the receptacle 102 on the housing 22. In an example, the locating holes 204 can be arranged at about 15 degree intervals, for example.

The second locating feature 206, 206' can be one or more locating pins 208, 208' that are sized to be received in a corresponding one of the mounting holes 204. In one example, the one or more locating pins 208 are disposed on the outer surface 24 of the housing 22 such that the pins 208 extend outwardly from the housing 22, as seen in FIG. 1A. In this example, locating pins 208 may be provided on the outer surface 24 of the luminaire's housing 22 where the receptacle 102 is to be mounted. The locating pins 208 extend outwardly and can extend through the gasket 110 that is between in the housing the receptacle 102.

In another example, the one or more locating pins 208' are disposed on the mounting side 136 of the locking base 104 such that the pins 208 extend in the direction of the inner surface 26 of the housing 22, as seen in FIG. 1B. The locating pins 208' can be positioned on the supports 138, for example, that extend between the inner and outer ring walls 132 and 134 of the locking base 104. Holes 210' are disposed on the housing wall 22 that correspond to the locating pins 208' for receiving the locating pins 208' when assembling the receptacle assembly 100.

In some examples, the locating mechanism 200, via the cooperation between the locating holes 204 and the locating pins 208, 208', allows for locating and mounting of the receptacle 102 in the desired orientation without the need for additional fasteners, such as screws. It should be understood, that the locating mechanism 200 and its locating holes 204 and locating pins 208, 208' can be reversed, such that the locating holes 204 are disposed on the housing 22 or the locating base 104, and the locating pins 208, 208' can be disposed on the outer ring portion 120 of the receptacle 102 such that they extend towards the housing 20 when mounting the receptacle 102 thereto.

FIGS. 1A, 2-5A illustrate an example of a method for assembling and mounting the receptacle assembly 100 to the housing 20. In this example, the gasket 110 is placed on the outer surface 24 of the housing 22 at the opening 28 of the housing 22, as seen in FIG. 2. The gasket 110 is placed on outer surface 24 of housing 22 such that the locating pins 208 on the housing 22 extend through the gasket 110. The rotatable receptacle 102 is mounted onto the outer surface 24 of the housing 22. The receptacle 102 can be mounted to the housing 22 by inserting the insert portion 118 of the receptacle 102 into the opening 28 of the housing 22, as seen in FIGS. 3A and 3B. The mounting face 122 of the outer ring portion 120 is axially spaced from the housing 22 with the gasket 110 therebetween.

Once the insert portion 118 is inserted into the housing 22, the rotatable receptacle 102 to orient the rotatable receptacle 102 is rotated in a desired direction for optimal positioning of the photoelectric device 10, e.g. in the North direction, as seen in FIG. 9. After orienting the rotatable receptacle 102 in the desired direction, the rotatable receptacle 102 is moved toward the outer surface 24 of the housing 20 and the corresponding locating features 202 and 206 of the receptacle assembly 100 are engaged, thereby fixing the rotatable receptacle 102 in the desired direction. The receptacle 102 is moved axially toward the housing 20 such that the locating pins 208 are engaged with and received in the corresponding locating holes 204 of the outer ring portion 120 of the receptacle 102 and the mounting face 122 of the outer ring portion 120 mounts to or abuts the outer surface 24 of the housing.

The rotatable receptacle 102 can be secured to the housing 22 via the locking base 104 and the retention member 106. As seen in FIG. 4, the locking base 104, which is inside of the housing 22, is moved to receive the insert portion 118 of the receptacle 102. The locking base 104 is moved axially toward the inner surface 26 of the housing 20 until the mounting side 136 of the locking base 104 mounts to or abuts the inner surface 26 of the housing 20. The retention member 106 is then releasably engaged with the opposite side 137 of the locking base 104 and engaged with the insert portion 118 of the receptacle 102, as seen in FIGS. 5A and 5B.

Figure 10:
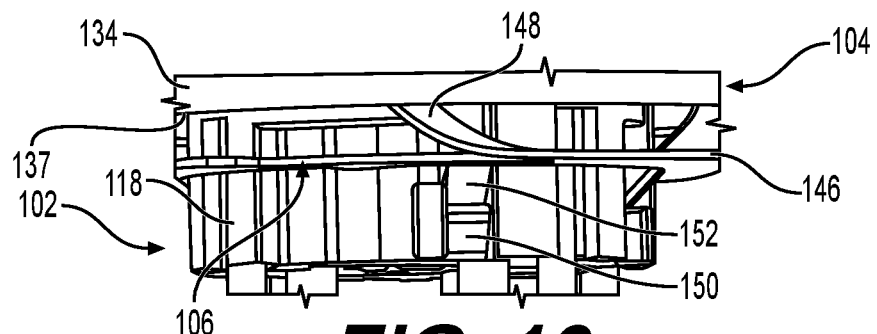
FIG. 10 is a partial elevational view of the retention member of the receptacle assembly illustrated in FIGS. 1A and 1B, showing the retention member engaged with the receptacle.
Figure 11A:
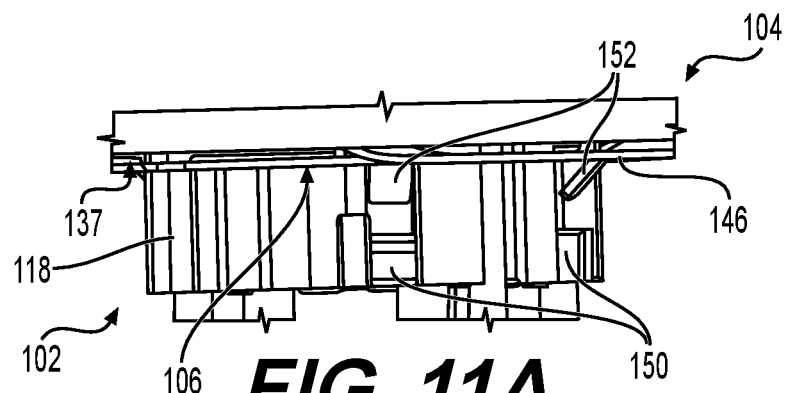
FIGS. 11A, B and 11C are partial elevational views of the retention member shown in FIG. 10, showing the steps of releasing the retention member from the receptacle.
Figure 11B:
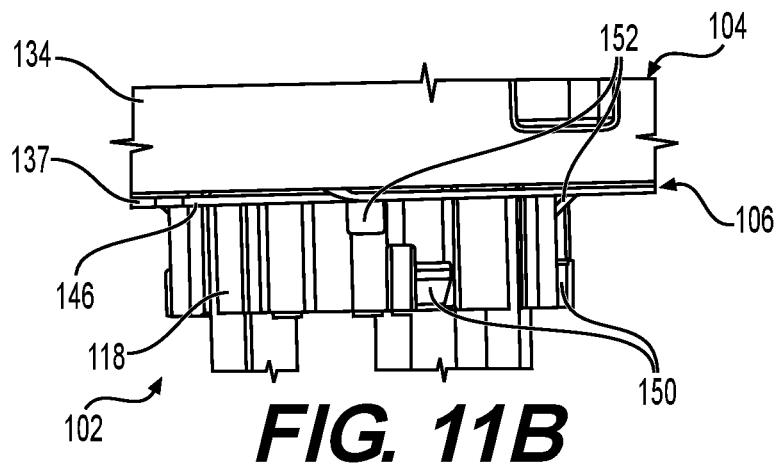
Figure 11C:
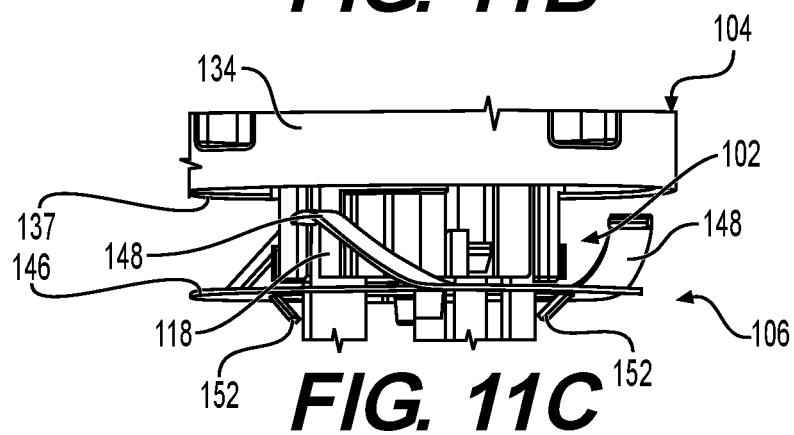

To engage the retention member 106, the retention member 106 is moved axially toward the locking base 104 such that one or more flexible tabs 152, that extends inwardly from the ring 146 of the retention member 106, snaps over corresponding detents 150 on the outer surface of the insert portion 118, as seen in FIGS. 5B and 10. The spring arms 148 are also received inside of the outer ring wall 134 of the locking base 104. To release the retention member 106 from the locking base 104 and the insert portion 118, the ring 146 of the retention member 106 is pushed closer to the side 137 of the locking base 104 and away from the detent 150, as seen in FIG. 11A, then the retention member 106 is rotated such that the flexible tabs 152 of the retention member 106 clear the detents 150 of the insert portion 118, as seen in FIG. 11B, and then the retention member 106 can be pulled away from the locating base 104 and the insert portion 118, as seen in FIG. 11C, to release the retention member 106.

FIGS. 1B, 6A, 6B, 7A, and 7B illustrate another example of a method of the present disclosure for assembling and mounting the receptacle assembly 100 to the housing 20. This method is similar to the method described above, except that the base 104 is positioned on the housing 22 prior to mounting the receptacle 102. The locating base 104 is positioned with respect to the inners surface 26 of the housing 22 such that the locating pins 208' that extend from the mounting side 136 of the locking base 104 extend through the corresponding holes 210' (FIG. 6A) in the housing 22 and through the gasket 110. The receptacle 102 is then mounted to the housing 20 by inserting the insert portion 118 into the housing 22 in the same manner described above. And the receptacle 102 is rotated to the desired direction, as seen in FIG. 9. The receptacle 102 is moved toward the housing 22 until the locating pins 208' engage with and are received in the mounting holes (FIG. 8) of the outer ring portion 120 of the receptacle 102 to fix the receptacle in the desired position. The retention member 106 can then be added to engage the locking base 104 and the insert portion 118 of the receptacle 102 in the same manner described above.

In some examples, the rotational orientation of the receptacle 102 and the receptacle assembly 100 can be easily adjusted by lifting the receptacle 102 at its outer ring portion 120, rotating the receptacle 102 with respect to the locating pins 208, 208', and releasing the receptacle 102 such that the locating pins 208, 208' are received in different locating holes 204 of the outer ring portion 120 than they were before.

Luminaries can be provided with the electrical receptacle assembly 100 for mating with the photoelectric device 10, such as a photoelectric controller or photocell, such that the photoelectric device 10 is mounted with the luminaire 20. The receptacle assembly 100 can be electrically wired into the power supply of the luminaire 20 via wiring 115. The photoelectric device 10 can be plugged into the receptacle 102 at the electrical face 112 to provide photoelectric control of the luminaire 20. The photoelectric device 10 has a number of prongs which are inserted into the corresponding sockets 114 in the receptacle 102 by applying insertion pressure on the device 10. After the prongs are completely inserted in the sockets 114, the photoelectric device 10 can then be rotated, via the rotatable receptacle assembly 100, to the optimal position.

After insertion into the receptacle 102, the photoelectric device 10 can be orientated in a desired direction, such as a northerly direction (in the northern hemisphere and a southerly direction in the southern hemisphere) by using indicia 116, such as the letter "N", the word "North", an arrow pointing North, or the like, on the electrical face 112 of the receptacle 102 to optimize the operation of the photoelectric cell of the device 10. This can be done while the receptacle assembly 100 remains mounted to the luminaire's housing 22. The position of the photoelectric device 10 can then be fixed in place by locating mechanism 200.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

What is claimed is:

1. An electrical receptacle assembly for mounting to a housing of a luminaire, comprising:
    a rotatable receptacle having an insert portion with an electrical face configured to mate with a photoelectric device and an outer ring portion having a mounting face opposite the electrical face, the mounting face being configured to mount on the housing;
    a locating mechanism configured to orient the rotatable receptacle on the housing in a desired direction for optimal positioning of the photoelectric device;
    a locking base configured to receive at least a portion of the insert portion; and
    a releasable retention member configured to couple to the locking base and the insert portion of the rotatable receptacle for securing the electrical receptacle assembly to the housing of the luminaire,
    wherein the locating mechanism comprises corresponding locating features including one or more locating holes formed in the mounting face of the outer ring portion that are each configured to receive a locating pin on the locking base.

2. The receptacle assembly of claim 1, further comprising a gasket disposed between the mounting face of the outer ring portion of the rotatable receptacle and a mounting side of the locking base.

3. The receptacle assembly of claim 1, wherein the receptable assembly is toolless.

4. The receptacle assembly of claim 1, wherein each locating pin extends from a mounting side of the locking base and is configured to extend through the housing.

5. The receptacle assembly of claim 4, wherein each locating pin extends through a gasket disposed between the outer ring portion of the rotatable receptacle and the locking base.

6. The receptacle assembly of claim 1, wherein the electrical face of the insert portion includes indicia that facilitates proper positioning of the rotatable receptacle.

7. The receptacle assembly of claim 6, wherein the indicia is the letter N or the word North.

8. The receptacle assembly of claim 1, wherein the releasable retention member is a spring member that comprises a locking base engagement portion and an insert portion engagement portion.

9. The receptacle assembly of claim 8, wherein the locking base engagement portion is a substantially flat ring and the insert portion engagement portion is one or more spring arms extending from the ring, substantially flat ring.

10. A kit of components for a photoelectric receptacle assembly, comprising:
- a rotatable receptacle having an insert portion with an electrical face configured to mate with a photoelectric device and an outer ring portion having a mounting face opposite the electrical face, the mounting face being configured to mount to an outer surface of a housing of a luminaire;
- a locating mechanism configured to orient the rotatable receptacle on the housing in a desired direction for proper positioning of the photoelectric device;
- a locking base comprising a ring body configured to receive at least a portion of the insert portion, the locking base having a mounting side for mounting to an inner surface of the housing of the luminaire;
- a releasable retention member configured to couple to the locking base at a side of the locking base that is opposite the mounting side of the locking base and configured to couple to the insert portion of the rotatable receptacle,
- wherein the locating mechanism includes one or more locating holes in the mounting face of the outer ring portion of the rotatable receptacle,
- wherein the locating mechanism includes one or more locating pins, and each locating hole is sized to received one of the locating pins, and
- wherein the one or more locating pins extend from the mounting side of the locking base.

11. The kit of claim 10, further comprising a gasket configured to fit between the outer ring portion of the rotatable receptacle and the locking base.

12. The kit of claim 10, wherein the releasable retention member includes a spring member that comprises a locking base engagement portion and an insert portion engagement portion, and wherein the locking base engagement portion is a substantially flat ring and the insert portion engagement portion is one or more spring arms extending from the substantially flat ring.

13. An electrical receptacle assembly for mounting to a housing of a luminaire, comprising:
- a rotatable receptacle having an insert portion with an electrical face configured to mate with a photoelectric device and an outer ring portion having a mounting face opposite the electrical face, the mounting face being configured to mount on the housing;
- a locating mechanism configured to orient the rotatable receptacle on the housing in a desired direction for optimal positioning of the photoelectric device;
- a locking base; and
- a releasable retention member configured to couple to the locking base and the insert portion of the rotatable receptacle for securing the electrical receptacle assembly to the housing,
- wherein the releasable retention member is inserted into and positioned within the locking base.

14. The receptacle assembly of claim 13, further comprising a gasket disposed between the mounting face of the outer ring portion of the rotatable receptacle and a mounting side of the locking base.

15. The receptacle assembly of claim 13, wherein the receptable assembly is toolless.

16. The receptacle assembly of claim 13, wherein the locating mechanism comprises corresponding locating features including one or more locating holes formed in the mounting face of the outer ring portion that are each configured to receive a locating pin on the housing.

17. The receptacle assembly of claim 16, wherein the locating holes are arranged annularly and spaced apart on the outer ring portion.

18. The receptacle assembly of claim 16, wherein each locating pin extends through a gasket that is disposed between the outer ring portion of the rotatable receptacle and the locking base.

19. The receptacle assembly of claim 13, wherein the locating mechanism comprises corresponding locating features including one or more locating holes formed in the mounting face of the outer ring portion that are each configured to receive a locating pin on the locking base.

20. The receptacle assembly of claim 19, wherein each locating pin extends from a mounting side of the locking base and is configured to extend through the housing.

21. The receptacle assembly of claim 20, wherein each locating pin extends through a gasket disposed between the outer ring portion of the rotatable receptacle and the locking base.

22. The receptacle assembly of claim 13, wherein the electrical face of the insert portion includes indicia that facilitates proper positioning of the rotatable receptacle.

23. The receptacle assembly of claim 22, wherein the indicia is the letter N or the word North.

24. The receptacle assembly of claim 13, wherein the releasable retention member is a spring member that comprises a locking base engagement portion and an insert portion engagement portion.

25. The receptacle assembly of claim 24, wherein the locking base engagement portion is a substantially flat ring and the insert portion engagement portion is one or more spring arms extending from the substantially flat ring.

* * * * *